United States Patent Office 3,554,920
Patented Jan. 12, 1971

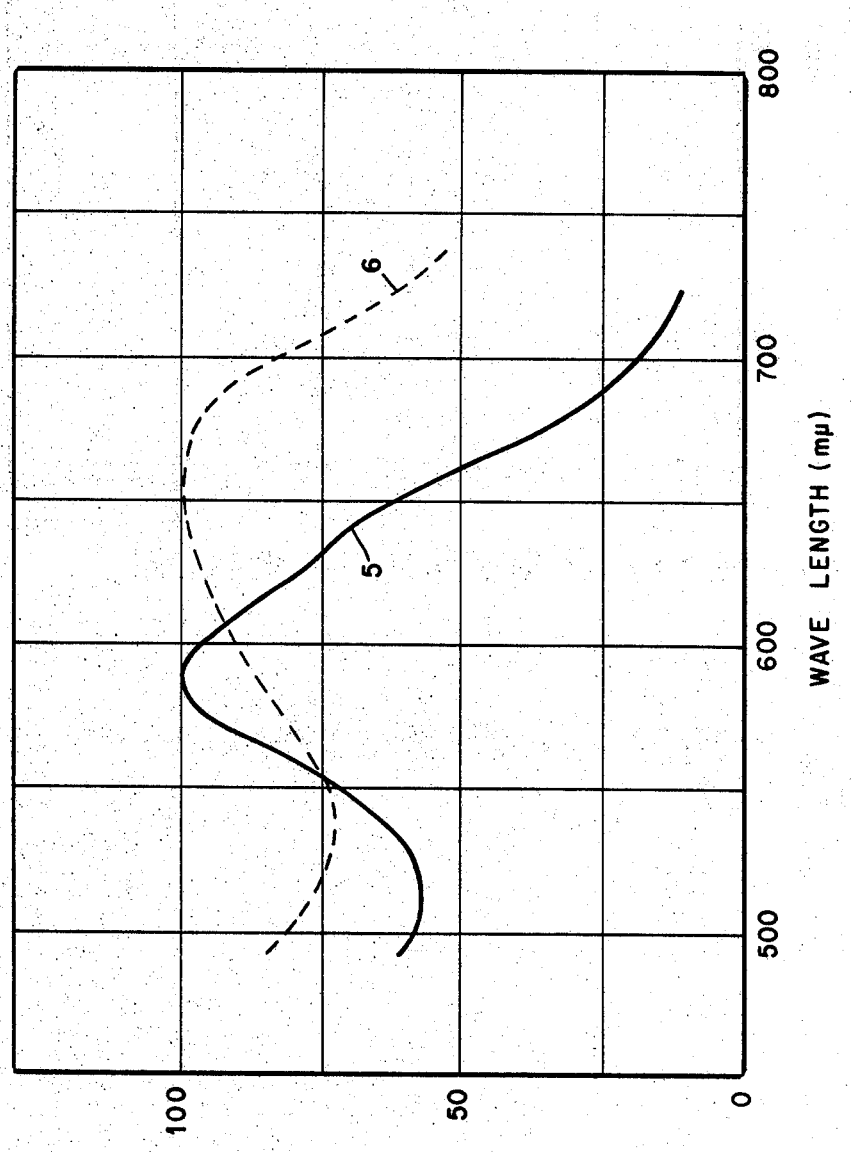

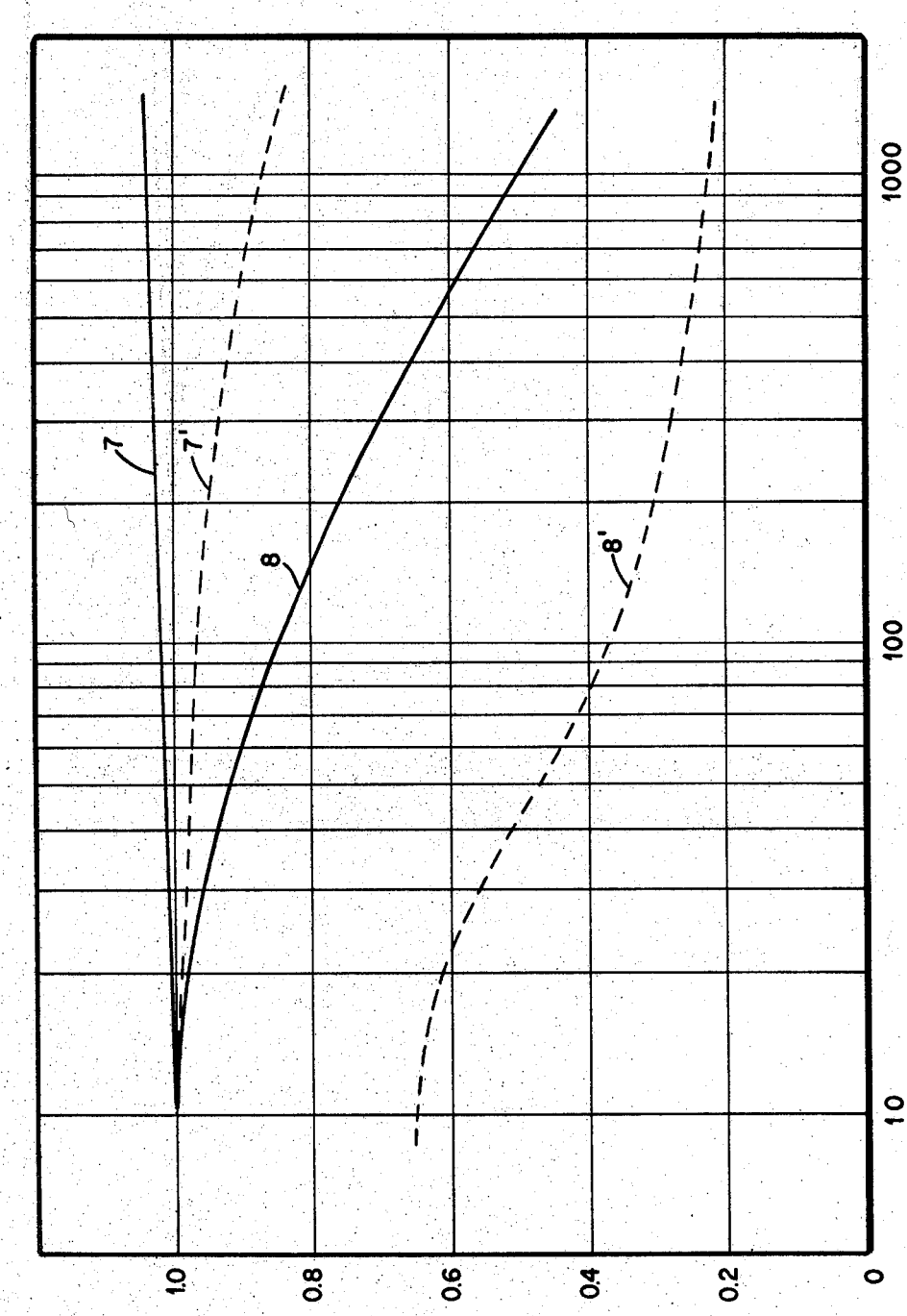

3,554,920
ENERGY INDEPENDENT RADIOPHOTOLUMI-
NESCENCE DOSIMETER WITH GOOD FAD-
ING STABILITY
Klaus H. Becker, Oak Ridge, Tenn., assignor to the United
States of America as represented by the United States
Atomic Energy Commission
Filed Apr. 19, 1968, Ser. No. 722,711
Int. Cl. C03c 3/00; G01t 1/20; H01j 39/00
U.S. Cl. 252—301.4    5 Claims

ABSTRACT OF THE DISCLOSURE

A dosimeter having an essentially energy independent response without the use of filters and being substantially stable against fading is provided by a lithium borate glass containing Li, B, and Ag. This glass may be prepared, for example, by melting a mixture of $LiNO_3$, $B_2O_3$, and $AgPO_3$ in various proportions. The glass also permits sensitive measurements at high temperatures, the measurement of a thermal neutron component in mixed $(n, \gamma)$ radiation fields, and sensitive measurements at high dose levels such as occur in sterilization and food processing systems.

BACKGROUND OF THE INVENTION

The invention described herein was made in the course of, or under, a contract with the United States Atomic Energy Commission.

In the field of solid state dosimetry there are two general systems presently in use: thermoluminescence and radiophotoluminescence. In the prior art, the choice of one or the other of these competitive systems has depended upon the relative advantages or disadvantages of each for specific applications.

In the thermoluminescence detector art, crystals such as LiF are utilized to absorb and store the energy deposited by irradiation. While there is no visible change to the crystal upon storage of this energy, the crystal becomes luminescent upon the application of heat and the light given off is proportional to the amount of energy that is stored. While having a disadvantage in that the record of the dose is destroyed in the heating process, this system has an advantage in that the response of the dosimeter is essentially energy independent for X- and gamma-radiation and thus can more easily be related to biological effects.

The radiophotoluminescence detectors, on the other hand, give off visible light when exposed to ultraviolet light and the amount of light in a certain spectral region is proportional to the integrated amount of radiation to which the detector has been exposed. These devices, referred to as glass dosimeters because of the nature of their structure, provide permanent records of dose as they may be "read" repeatedly without affecting the stored information. However, they are more sensitive to X- than to gamma-radiation, and absorption filters, ratio readings, etc., must be used in order to relate the data to tissue dose. This is similar to the problem of using photographic emulsions for dosimetry, as well as many other substances that are energy dependent in their photon response.

Thus, the radiophotoluminescence detectors have the main advantage of the permanence of the radiation response independently of the number of measurements. However, glass dosimeters, since their introduction several years ago, have always been fabricated from silver-activated metaphosphates and such dosimeters are energy dependent, as mentioned above, particularly for photon energies from about 10 to 300 kev., and also such dosimeters are not very stable against fading, particularly at high temperatures. In addition, such prior glass dosimeters could not effectively be used in accurately detecting high dose levels such as occur in several industrial applications of radiation because of the fading instability and energy dependence of the discoloration used as a means of dose increments for such high dose levels.

Thus, there exists a need for a dosimeter that combines the advantages of both of the above systems such as to provide a permanent record of the dose, while at the same time being energy independent such as to permit sensitive integrating dose measurements even at high temperatures and/or at high dose levels. The present invention was conceived to meet this need in a manner to be discussed hereinbelow.

SUMMARY OF THE INVENTION

With a knowledge of the limitations of prior art dosimeters, as discussed above, it is the object of the present invention to provide an improved dosimeter that will effectively meet the need as discussed in the preceding section and that can be used as a low-level (personnel) dosimeter as well as a dosimeter for detecting high radiation doses. This has been accomplished in the present invention by providing a silver-activated lithium borate glass with a substantially low silver concentration such that the dosimeter glass has very little energy dependence, and the radiation effect is permanently recorded in the glass. Low doses are recorded by radiophotoluminescence, high doses by the formation of optical absorption bands in the near-ultraviolet. Such a glass is more stable at elevated temperatures than conventional metaphosphate glass dosimeters. Thus, the present invention provides for the first time a glass dosimeter that is essentially energy independent, provides a permanent record of the dose, and is stable even at high temperatures. Also, it exhibits a remarkable difference between the radiophotoluminescence and the absorption spectra obtained by thermal neutron and gamma radiation.

BRIEF DESCRIPTION OF THE DRAWINGS

FIG. 2 is a plot of spectral radiant intensity as a function of wavelength for a glass of the present invention which was exposed to gamma and thermal neutron irradiation during stimulation with ultraviolet light at 365m$\mu$, normalized for peak intensity=100; and FIG. 3 is a plot of the relative radiophotoluminescence intensity as a function of storage time at 250° C. after $^{60}Co$ irradiation and after thermal neutron exposure of a typical (Toshiba) phosphate glass and a lithium borate glass of the present invention.

DESCRIPTION OF THE PREFERRED EMBODIMENT

Figure 1:
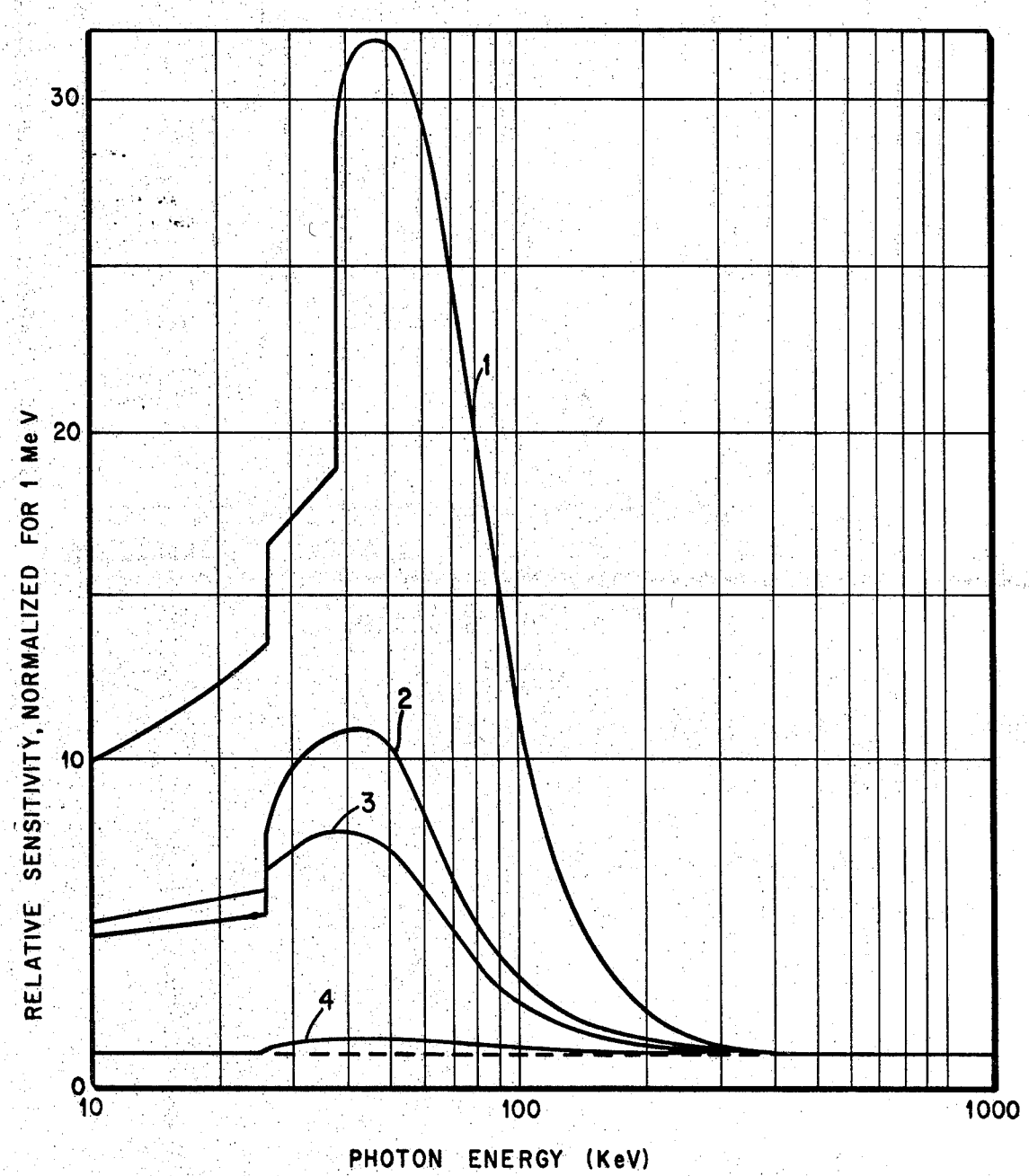
FIG. 1 is a plot of the relative radiophotoluminescence sensitivity for several glasses of the prior art as contrasted to one of the glasses of the present invention.

The lithium borate glass of the present invention may be prepared in the following manner: Finely powdered components were added to a mortar in the following proportions, for example: 5.17 g. $LiNO_3$ (or the corresponding amount of $Li_2CO_3$); 7 g. $B_2O_3$; and 0.045 g. $AgPO_3$. These were thoroughly mixed and thereafter transferred to a platinum crucible. The mixture was heated in air to about 950° C., which is above the melting point, for about half an hour. The melt was quickly cooled to room temperature and a good quality glass was formed. It should be understood that the above proportions are given by way of example only. For instance, the amount of $LiNO_3$ or the corresponding amount of $Li_2CO_3$ may range from 1 to more than 7 g.; the amount of $AgPO_3$ may range from 0.01 g. to 0.20 g. and the amount of $B_2O_3$ does not vary but is fixed at a value of about 7 g. In addition, because only the $Li_2O$ of the lithium compound actually is a constituent of the final glass, other lithium compounds which decompose during the melting process, thus forming $Li_2O$ in the final glass, can also be used. The $Li_2O$ content in the final glass may range from 0.2 to 2 g. Also, other compounds of silver which are soluble in the melt can be used instead of the $AgPO_3$. For example, $AgNO_3$ or $Ag_2CO_3$ can be used instead of $AgPO_3$.

A glass base prepared from 3.45 g. of $LiNO_3$ or the corresponding amount of $Li_2CO_3$ and 7 g. of $B_2O_3$, corresponding to a resulting glass formula of $((Li_2O \cdot 4B_2O_3)$ was utilized for determining the curve 4 of FIG. 1 and the curves 5 and 6 of FIG. 2, and the amount of $AgPO_3$ added to this glass base was 0.73% for curve 4 of FIG. 1, and it was 0.37% for curves 5 and 6 of FIG. 2. For the curves 7 and 7' of FIG. 3, the glass base was prepared from 5.17 g. of $LiNO_3$ or the corresponding amount of $Li_2CO_3$ and 7 g. of $B_2O_3$, corresponding to a resulting glass formula of $(Li_2O \cdot 3B_2O_3)$ to which 0.55% $AgPO_3$ was added.

Although the $AgPO_3$ concentration in the glass base may be varied from about 0.37% to 3%, it is preferred to keep the concentration below 1%, which is desirable from the viewpoint of energy dependence. For example, a glass base of $(Li_2O \cdot 4B_2O_3)$ containing about 6.0% of $AgPO_3$ would have the same energy dependence as the thermoluminescence detector comprising unactivated lithium fluoride. However, the radiophotoluminescence buildup at low silver concentrations in the lithium borate glasses of the present invention is a slow process, and it becomes necessary to provide a timed, stabilizing heat treatment to the irradiated glass prior to evaluation thereof. For example, it would require from 0.5 to 3 hours at 320° C. to obtain the maximum stable radiophotoluminescence intensity in the irradiated glass.

The energy dependence of a glass composition of the present invention comprising $(Li_2O \cdot 4B_2O_3)$ plus 0.73% $AgPO_3$ is almost linear as shown in the curve 4 of FIG. 1. (The dotted line in this figure indicates complete energy independence.) The energy dependence of several commercially available metaphosphate glasses is also shown in FIG. 1 by the curves 1, 2, and 3 for comparison with the curve 4 representing one of the glasses of the present invention. Curve 1 represents a high-Z glass made by Bausch & Lomb, Rochester, N.Y.; curve 2 represents a low-Z glass also made by Bausch & Lomb; curve 2 also represents a glass designated as P–1 made by Toshiba, Tokyo, Japan; and curve 3 represents a glass made by C.E.C., Montrouge, France. Since the glasses represented by curves 1, 2, and 3 of FIG. 1 are energy dependent, absorption filters, ratio readings, etc., must be used in order to relate the data to tissue dose, while such means are not required for the glass of the present invention represented by curve 4, which is substantially energy independent, and the data can be related directly to the tissue dose.

It has been determined that the radiophotoluminescence light emission spectrum depends on the linear energy transfer of the radiation. As can be seen in FIG. 2, the spectrum of radiophotoluminescence caused by gamma radiation, as represented by curve 5, is different from the one created by thermal neutrons, as represented by curve 6, which interact via $(n, \alpha)$ reactions with Li and B. This effect could be used for separate photon and neutron measurements in the same glass simply by changing the wavelength at which the evaluation is done, for instance, by switching optical filters in the spectrofluorimeter readers. Also, possible errors in the photon measurements, because of thermal neutron effects on the glass, can be avoided in this manner. As mentioned above, the glass composition utilized for plotting the curves of FIG. 2 was $(Li_2O \cdot 4B_2O_3) + 0.37\%$ $AgPO_3$. It should be noted that, for the prior art metaphosphate glasses, little or no difference could be observed in the spectra after gamma and thermal neutron irradiation of such glasses. Thus, separate measurements of the gamma and thermal neutron effects in such glasses could not be effected.

The glasses of the present invention with low Ag concentrations are much more stable against fading at high temperatures than the conventional metaphosphate glasses. In fact, it has been found that little fading of the radiation effect occurs when a glass of the present invention is stored at 250° C. after irradiation, as shown in FIG. 3. The curves 7 and 7' of FIG. 3 represent the gamma and neutron effects, respectively, from a glass of the present invention comprising $(Li_2O \cdot 3B_2O_3) + 0.55\%$ $AgPO_3$ which was stabilized after irradiation by a heat treatment at 325° C. for several hourse. The curves 8 and 8' of FIG. 3 represent the gamma and neutron effects, respectively, from a Japanese Toshiba P–1 phosphate glass. Thus, for storage at an elevated temperature, the fading is accelerated at such a temperature for the Toshiba glass, while only little fading occurs in the present lithium borate glass. It can be seen from FIG. 3 that, for storage of the irradiated glasses at 250° C., 50% of the gamma radiation effect for the Toshiba glass, curve 8, is annealed after 1000 minutes. On the other hand, for the lithium borate glass of the present invention, the gamma radiation effect therein was found to be constant within ±3% for at least 5000 minutes, which is not shown in FIG. 3. After this time, only 25% of the gamma radiation effect in the Toshiba glass remained. Thus, it should be evident that the glasses of the present invention with such an unusual temperature resistance, which tolerate temperatures of 250° C. for many days or higher temperatures for correspondingly shorter times (for instance, several hours at 320° to 350° C.) with substantially little fading, can be used for sensitive integrating gamma dose measurements at high temperatures. Neither thermoluminescence dosimeters, photographic film, ionization chambers, nor scintillation detectors are capable of withstanding such temperatures for extended periods of time.

As also illustrated in FIG. 3, the radiophotoluminescence centers induced by high linear energy transfer radiation (alpha particles and tritons from the B and Li $(n, \alpha)$ reactions) are considerably less stable against fading than the gamma radiation induced centers for the Toshiba glass. Only about 45 minutes at 250° C. is required to anneal 50% of the thermal neutron effect as compared to 1000 minutes for the gamma radiation effect in the phosphate Toshiba glass, as can be seen from curve 8'. On the other hand, in the present lithium borate glass, there is a 12% fading of the thermal neutron effect, curve 7', after 1000 minutes as compared to a 3% buildup for the gamma radiation effect after the same time interval.

The dosimeter glasses of the present invention, like all other solid-state dosimeters, have to be protected against dirt, mechanical damage, or disturbing climatical influences such as humidity by encapsulation in a suitable container. This container can be designed in such a way that the total energy dependence of the encapsulated detector is very small. In addition, the weathering characteristics of the dosimeter glass may be improved by the known technique of adding a small amount of certain components such as $SiO_2$ or $BeO$ to the glass mixture for improving its weathering resistance, and this amount can be varied from less than 1 to a few percent without adversely affecting the other properties of the glass, as discussed above.

In summary, all materials used prior to the present invention have the disadvantages set forth hereinabove, namely: the lack of a permanent record of thermoluminescent dosimeters, the energy dependence of the metaphosphate radiophotoluminescent dosimeters, and the undesirable fading characteristics of the latter dosimeters at elevated storage temperatures. The present invention utilizing the lithium borate glasses, as discussed above, overcomes the above disadvantages such that a dosimeter is provided that is essentially energy independent, that provides for a permanent recording of the dose, that has good fading stability even at high temperatures, and that will permit the possible measuring of thermal neutron and gamma doses separately with the same dosimeter glass using the differences in the radiation induced spectrums. The present dosimeter can be used either as a low-dose detector (personnel dosimeter) by measurement of its radiophotoluminescence or as a dosimeter for high doses such as occur in industrial uses of radiation by measurement of its absorption changes.

This invention has been described by way of illustration rather than by limitation and it should be apparent that it is equally applicable in fields other than those described.

What is claimed is:

1. A dosimeter glass with low photon energy dependence having good fading stability at normal and elevated temperatures, comprising a lithium borate glass consisting essentially of $Li_2O$, $B_2O_3$, and a silver salt soluble in the glass matrix in the proportions, by weight, within the following limits:

| | G. |
|---|---|
| $Li_2O$ | 0.2–2 |
| $B_2O_3$ | 7 |
| Silver salt | 0.01–0.20 |

2. The dosimeter set forth in claim 1, wherein said silver salt is selected from the group consisting essentially of $AgPO_3$, $AgNO_3$, and $Ag_2CO_3$.

3. The dosimeter set forth in claim 2, wherein said silver salt is $AgPO_3$.

4. The dosimeter set forth in claim 3, wherein said glass also includes an additional compound selected from the group consisting essentially of $SiO_2$ and BeO in the proportion by weight from less than 1 to a few percent.

5. The dosimeter set forth in claim 4, wherein said additional compound is BeO.

References Cited

UNITED STATES PATENTS 3,463,664   8/1969   Yokota et al. _____ 106—47

FOREIGN PATENTS 1,124,917   8/1966   Japan _____ 106—47

TOBIAS E. LEVOW, Primary Examiner

M. L. BELL, Assistant Examiner

U.S. Cl. X.R.

106—47; 250—71.5, 83